US008934057B2

(12) United States Patent
Funada

(10) Patent No.: US 8,934,057 B2
(45) Date of Patent: Jan. 13, 2015

(54) DISPLAY APPARATUS

(71) Applicant: Canon Kabushiki Kaisha, Tokyo (JP)

(72) Inventor: Masahiro Funada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/755,378

(22) Filed: Jan. 31, 2013

(65) Prior Publication Data

US 2013/0194498 A1 Aug. 1, 2013

(30) Foreign Application Priority Data

Feb. 1, 2012 (JP) ................................ 2012-019512

(51) Int. Cl.

*H04N 5/46* (2006.01)
*H03L 7/00* (2006.01)
*H04N 5/268* (2006.01)
*H04N 9/64* (2006.01)

(52) U.S. Cl.

CPC ............... *H04N 5/268* (2013.01); *H04N 9/642* (2013.01)

USPC ............................ 348/558; 348/555; 348/547

(58) Field of Classification Search

USPC .......................................................... 348/547

See application file for complete search history.

(56) References Cited

U.S. PATENT DOCUMENTS 5,305,105 A * 4/1994 Heo .............................. 348/485
2007/0182443 A1* 8/2007 Funada ......................... 324/770

FOREIGN PATENT DOCUMENTS

JP 2002-369096 A 12/2002
JP 2007-241261 A 9/2007

OTHER PUBLICATIONS

Office Action issued in corresponding Japanese Patent Application No. 2012-019512 dated Dec. 17, 2013.
NEC Viewteohnology, Ltd. Projector GT6000/GT5000 User's Manual, Fourth edition, [online], pp. 17, 36-37, 39, 110, 121, 131, 171. Relevant part of Japanese manual and English full text. Mar. 2004.

* cited by examiner

*Primary Examiner* — Jefferey Harold
*Assistant Examiner* — Michael Teitelbaum
(74) *Attorney, Agent, or Firm* — Rossi, Kimms & McDowell LLP

(57) ABSTRACT

A display apparatus includes a first determiner configured to determine a terminal into which a video signal inputs and to determine a terminal into which a synchronizing signal type inputs, a frequency measuring unit, a switch configured to connect one of first and second input terminals to the frequency measuring unit, and a second determiner configured to determine a video signal type input into the input terminal which is connected by the switch to the frequency measuring unit on the basis of a determination result of the synchronizing signal type in the first determiner and a measurement result of the frequency in the frequency measuring unit and to determine a video signal type input into the input terminal which is not connected by the switch to the frequency measuring unit on the basis of the determination result of the synchronizing signal type in the first determiner.

6 Claims, 3 Drawing Sheets

DISPLAY APPARATUS

BACKGROUND OF THE INVENTION

1. Field of the Invention

The present invention relates to a display apparatus and, in particular, relates to a projective display apparatus, such as a liquid crystal projector apparatus and a DLP (Digital Light Processing) projector apparatus, or the liquid crystal display.

2. Description of the Related Art

A display apparatus corresponding to a plurality of signal types, such as a digital RGB signal of a computer, an analog RGB signal, a HDMI (High-Definition Multimedia Interface) signal of an audio-video equipment, a component video signal and a composite video signal, is required. While input terminals different from each other may be provided to these various signals on the display apparatus, there is an example where one input terminal is used for different signal types, for example the analog RGB signal and the component video signal, in order to save space. Even when one input terminal is used for different signal types, the signal type in each input can be selected from an input select menu of OSD (On Screen Display) by an operation of a user. However, since the operation is annoying for the user, a technology to automatically determine the signal type is required.

Japanese patent Laid-Open No. 2007-241261 discloses a technology to determine a type of a synchronizing signal input from an input terminal by detecting the synchronizing signal type and a status of the frequency or the like.

However, in a conventional technology disclosed in Japanese Patent Laid-Open 2007-241261, in a case where the input terminal used for different signal types (or input terminal having a similar function) is additionally installed, a single line of a detector for detecting a status of the synchronizing signal must be additionally installed and the cost also increases. Therefore, the detector for detecting the status of the synchronizing signal is configured to not used in only each terminal but be used in different terminals by a switch, and the switch is synchronized with an input select menu operation of the user. However, the configuration cannot determine the signal type at one input terminal not selected by the user.

SUMMARY OF THE INVENTION

The present invention provides a display apparatus capable of determining a signal type at each terminal without significantly increasing the cost even when a plurality of input terminals which can be used for different signal types are installed.

A display apparatus as one aspect of the present invention includes a first input terminal capable of inputting a first video signal type and a second video signal type that is different from the first video signal type, a second input terminal capable of inputting the first video signal type and the second video signal type, a first determiner configured to determine whether a video signal is input into each of the first input terminal and the second input terminal and to determine a synchronizing signal type input to each of the first input terminal and the second input terminal, a frequency measuring unit configured to measure a frequency of a synchronizing signal of the video signal input to the first input terminal and the second input terminal, a switch configured to connect one of the first input terminal and the second input terminal to the frequency measuring unit, and a second determiner configured to determine a video signal type input into the input terminal which is connected by the switch to the frequency measuring unit on the basis of a determination result of the synchronizing signal type in the first determiner and a measurement result of the frequency in the frequency measuring unit and to determine a video signal type input into the input terminal which is not connected by the switch to the frequency measuring unit on the basis of the determination result of the synchronizing signal type in the first determiner.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 1:
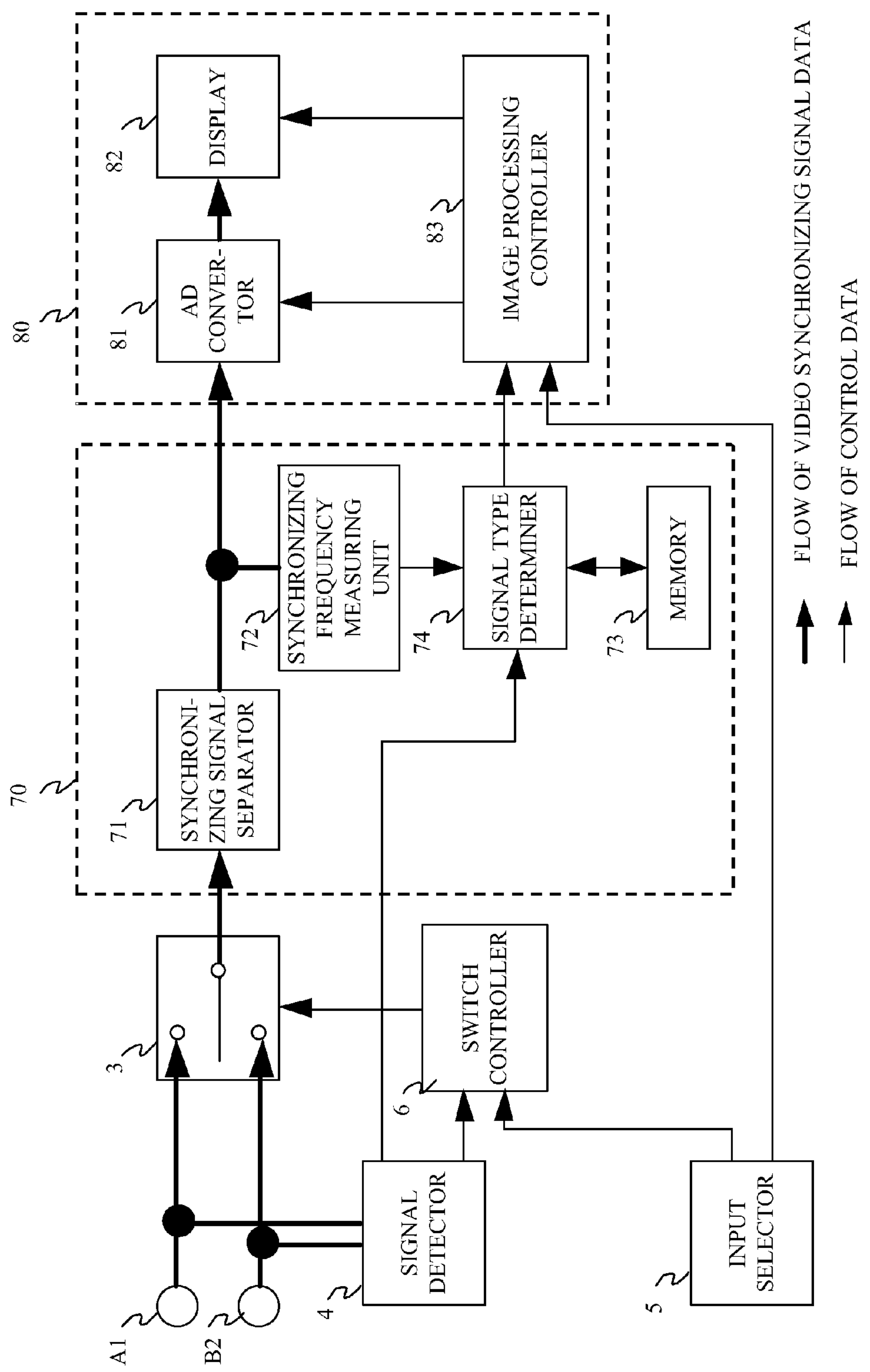
FIG. 1 is a block diagram of the display apparatus in an embodiment of the present invention.
Figure 2:
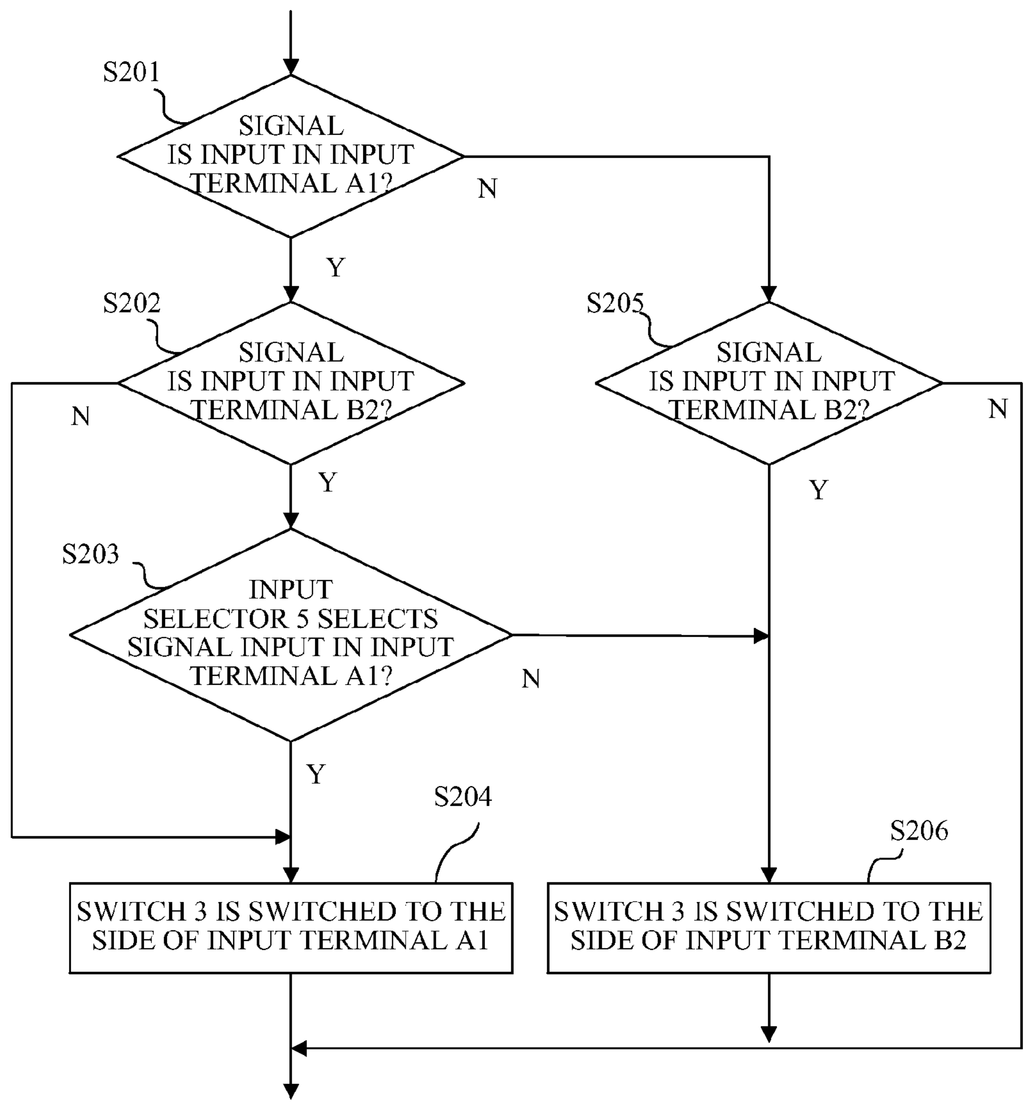
FIG. 2 is a control flow of a switch controller 6 in the embodiment of the present invention.
Figure 3:
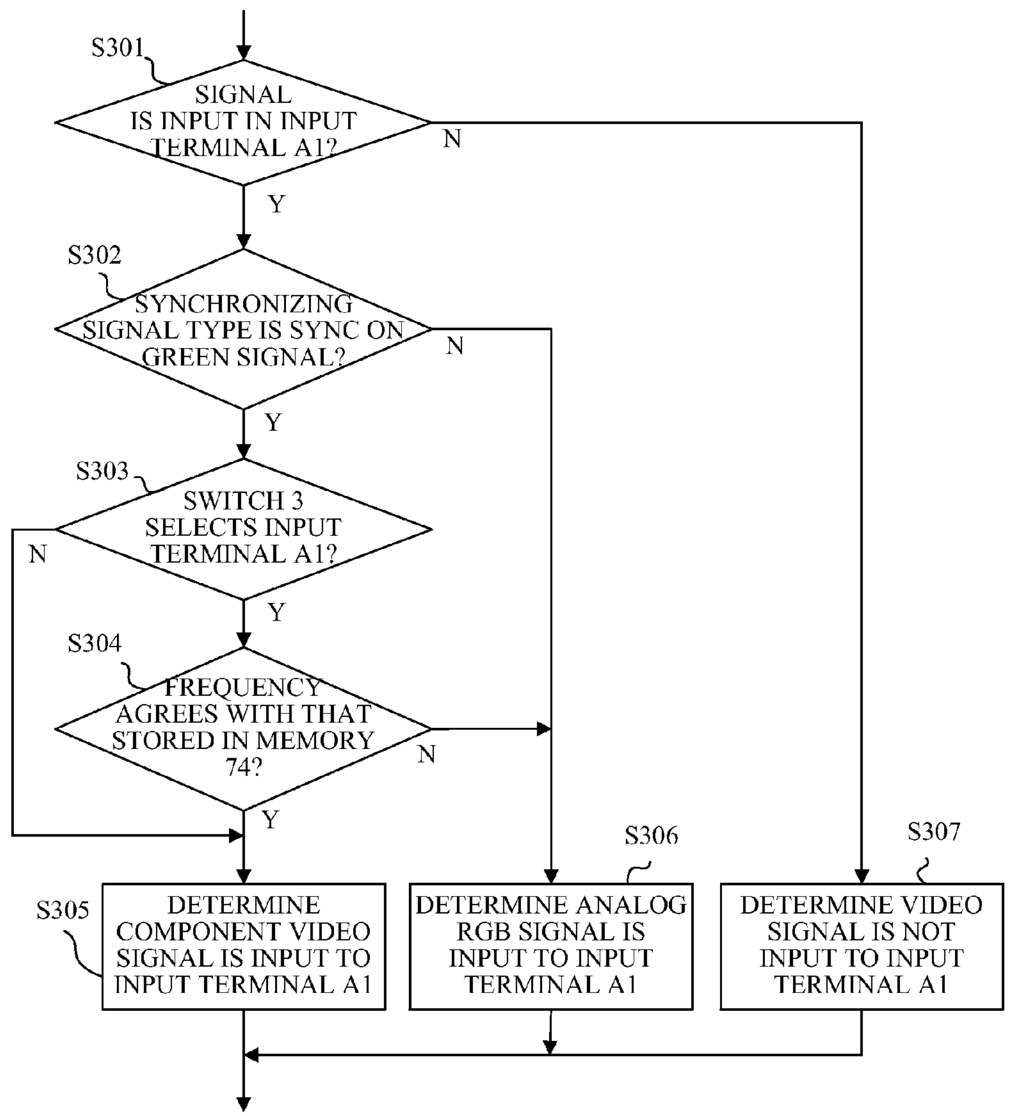
FIG. 3 is a determination flow in an input terminal A1 in a signal type determiner 74 in the embodiment of the present invention.

Hereafter, a display apparatus in a first embodiment of the present invention will be described with reference to FIGS. 1 to 3. FIG. 1 is a block diagram of the display apparatus related to the embodiment of the present invention. The display apparatus has an input terminal A1, an input terminal B2, a switch 3, a signal detector 4, an input selector 5, a switch controller 6, a video signal type determiner 70, and an image processor 80. The display apparatus of this embodiment can be applied to a projective display apparatus, such as a liquid crystal projector, DLP (Digital Light Processing) projector, or a liquid crystal display.

The input terminal A1 (first input terminal) and the input terminal B2 (second input terminal) are D-Sub 15 pin terminals, and are the input terminals for an analog RGB signal for a computer or the like and a component video signal for an audio-video equipment or the like. In other words, each of the input terminal A1 and the input terminal B2 is an input terminal capable of inputting two video signal types of the analog RGB signal (first video signal type) and the component video signal (second video signal type). Each of these has five types of signal sockets of a horizontal synchronizing signal line, a vertical synchronizing signal line, a R(Cr) signal line, a G(Y) signal line, and a B(Cb) signal line, which are connected with the computer or the audio-video equipment.

The switch 3 outputs, to the video signal type determiner 70 thereafter, one of the video signals that are input to the input terminal A1 and the input terminal B2, according to a switch controller 6. In other words, the switch controller 6 switches the connection between the video signal type determiner 70 including a synchronizing signal separator 71 and the like and the input terminal A1 or the input terminal B2.

The signal detector 4 (first determiner) monitors the G(Y) signal line and the horizontal/vertical synchronizing signal lines from each of the input terminals A1 and B2 to determine the presence or absence of the video signal (that is to say, synchronizing signal) (whether the video signal is input), and further determines a synchronizing signal type thereof when the presence of the synchronizing signal is determined (when it is determined that the synchronizing signal is input). As to the synchronizing signal type, two types of synchronizing signals can be determined, which are a sync on green signal where a composite synchronizing signal is combined with the G(Y) signal line, and horizontal/vertical separation synchronizing signals where a horizontal synchronizing signal from the horizontal synchronizing signal line and a vertical synchronizing signal from the vertical synchronizing signal line are respectively input. The present invention can be realized by the above two types, but it is preferable to further perform the determination with respect to a composite synchronizing signal input from the horizontal synchronizing signal line.

The input selector 5 is operated by a user, and selects an input signal displayed in the display apparatus. This embodiment can select, as the input signal, four types of an analog RGB signal A and a component video signal A which are input from the input terminal A1, and of an analog RGB signal B and a component video signal B which are input from the input terminal B2. As a concrete method for the selection, a menu operation using a control button (not illustrated) or OSD (on screen display) or the like can be applied, but the present invention is not limited thereto.

The switch controller 6 performs a switch control of the switch 3 depending on a determination result of the presence or absence of the synchronizing signal in the signal detector (first determiner) 4 and a selective state of the input selector 5. Detailed control flow will be described later.

The video signal type determiner 70 includes a synchronizing signal separator 71, a synchronizing frequency measuring unit (frequency measuring unit) 72, a memory 73 and a signal type determiner (second determiner) 74.

The synchronizing signal separator 71 outputs the synchronizing signal without modification when the horizontal/vertical separation synchronizing signals are being input, and separates the synchronizing signal into a horizontal/vertical separation form and outputs it when the horizontal/vertical separation synchronizing signals are not input but the sync on green signal is input. A video signal other than the synchronizing signal is output without processing.

The synchronizing frequency measuring unit (frequency measuring unit) 72 measures a frequency (or period) of each of the horizontal synchronizing signal and the vertical synchronizing signal that are input to the synchronizing frequency measuring unit 72, and gives notice to the signal type determiner 74.

The memory 73 stores a horizontal synchronizing frequency and a vertical synchronizing frequency in a format that corresponds to a display apparatus as a list on the basis of a standard that provides a synchronizing signal frequency of the component video signal.

The signal type determiner (second determiner) 74 determines types of video signals each input from the input terminal A1 and the input terminal B2. As to the input terminal which the switch 3 selects (contacts with the synchronizing frequency measuring unit), the determination is performed in detail according to the synchronizing signal type determined by the signal determiner (first determiner) 4 and the horizontal/vertical frequency (or period) measured by the synchronizing frequency measuring unit 72. On the other hand, as to the input terminal which the switch 3 does not select, the determination is easily performed based on only the synchronizing signal type determined by the signal detector (first determiner) 4. Detailed determiner flow will be described later.

The image processing portion 80 includes an AD (analog-digital) converter 81, a display 82, and an image processing controller 83.

The AD converter 81 performs an AD conversion for an analog video signal at a clamp level and a sampling frequency that are set by the image processing controller 83.

The display 82 includes the image display element that includes a plurality of pixels arranged adjacent to each other, and displays an input digital video signal as an optical image. Moreover, when the video signal type in the input terminal to which a selected input signal belongs is determined as a component video signal, a processing is performed so that the color space is converted from YCbCr into RGB. The display 82 further includes the OSD, and can display the state of the presence or absence of each input signal by the control of the image processing controller 83.

The image processing controller 83 controls the AD converter 81 and the display 82 according to the input signal selected by the input selector 5 and to a video signal type in each input terminal that is determined by the signal type determiner 74. When the video signal type in the input terminal to which the selected input signal belongs is determined as the analog RGB signal, the clamp level control of the AD converter 81 processes each RGB signal by pedestal clamp. On the other hand, when the video signal type is the component video signal, the G(Y) signal is processed by pedestal clamp and the B(Cb) signal and R(Cr) signal are processed by middle clamp. As to the sampling frequency control, the sampling frequency is decided by a sampling frequency determiner (not illustrated) based on the measurement result of the frequency (or period) measured by the synchronizing frequency measuring unit 72, and is set by the image processing controller 83. The display 82 is controlled so as to display the state of the presence or absence of the video signal of each input signal during the predetermined time period at every change of the determination result of the single type determiner 74.

The control flow of the switch controller 6 will be described. FIG. 2 illustrates the control flow of the switch controller 6. When no signal is input to the input terminal A1 (N in step S201) or to the input terminal B2 (N in step S205), the switch operation is not performed. When a signal is not input to the input terminal A1 (N in step S201) and is input to the input terminal B2 (Y in step S205), the switch 3 is switched to the side of the input terminal B2 (step S206). When a signal is input to the input terminal A1 (Y in step S201) and is not input to the input terminal B2 (N in step S202), the switch 3 is switched to the side of the input terminal A1 (step S204). When a signal is input to both of the input terminal A1 (Y in step S201) and the input terminal B2 (Y in step S202), the switching is performed depending on the selective condition of the input selector 5 (step S203). When the input selector 5 selects the input signal on the side of the input terminal A1, that is, the analog RGB signal A or the component video signal A, the switch 3 is switched to the side of the input terminal A1 (step S204). On the other hand, when the input selector selects the input signal on the side of the input terminal B2, that is, the analog RGB signal B or the component video signal B, the switch 3 is switched to the side of the input terminal B2 (step S206).

The determination flow in the signal type determiner 74 will be described. FIG. 3 illustrates the determination flow in the input terminal A1 in the signal type determiner 74. When no signal is input to the input terminal A1 (N in step S301), the signal type determiner 74 determines that the video signal is not input to the input terminal A1 (step S307). When a signal is input to the input terminal A1 (Y in step S301), the determination depends on the determination result of the synchronizing signal type (step S302). When the synchronizing signal type is not the sync on green signal (N in step S302), the signal type determiner 74 determines that the analog RGB signal is input to the input terminal A1 (step S306). When the synchronizing signal type is the sync on green signal (Y in step S302), the determination depends on the selective condition (step S303) in switch 3. When the switch 3 selects the side of the input terminal B2 (N in step S303), the signal type determiner 74 determines that the component video signal is input to the input terminal A1 (step S305). When the switch 3 selects the input terminal A1 (Y in step S303), the determination depends on the measurement result in the synchronizing frequency measuring unit 72 (step S304). When the measured frequency agree with a frequency stored in the memory, the signal type determiner 74 determines that the component video signal is input to the input terminal A1 (step S305), and if not, the signal type determiner 74 determines that the analog RGB signal is input to the input terminal A1 (step S306). The agreement means a complete agreement and a near agreement of shifting from the complete agreement within an allowable error. The video signal type of the input terminal B2 can be also performed by the same flow.

As a result of the above processing, in a case where the video signal is input to only one of the input terminals A1 and B2, the signal type determiner 74 can appropriately determine whether the analog RGB signal or the component video signal is input, regardless of the setting of the input selector 5. In a case where the video signal is input to both of the input terminals A1 and B2, the video signal type in the input terminal selected by the input selector 5 can be appropriately determined, and the video signal type in the input terminal not selected by the input terminal can be also determined albeit easily. Therefore, even in a case where the display apparatus is provided with the plurality of the input terminals used for plural signal types, the signal type can be determined at each terminal without significantly increasing the cost.

Although D-sub 15 pin terminals are used as the input terminals A1 and B2 in this embodiment, even when DVI-I terminal or 5BNC terminal is used, the same effect can be provided. Although the display 82 is configured to display the information of the presence or absence of the input video signal by the OSD, the information may be displayed by LED provided on an exterior part of the display apparatus. Although the input selector 5 is configured to select the input signal among four types, the input selector may be configured to select the input terminal and configured to use the determination result of the video signal type determiner 70 in the video signal type. In this case, the determination result of the video signal type in each input terminal is used as the content displayed in the display 82.

The "capable of inputting" in the present invention means that the analog RGB signal and the component signal can be input from the input terminal, and it is not always necessary that the input analog RGB signal and the input component signal can be output under adequate conditions. For example, the input terminal B2 is defined to be capable of inputting the analog RGB signal and the component signal, but may be configured to be able to output only one of the component signal and the RGB signal under the adequate conditions. In this time, the "adequate conditions" means that the clamp level control and the sampling frequency control of the AD convertor 81, the control of converting the color space in the display 82, or the like is performed properly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-019512, filed on Feb. 1, 2012 which is hereby incorporated by reference herein in its entirety.

What is claimed is:

1. A display apparatus comprising:

a first input terminal capable of inputting a first video signal type and a second video signal type that is different from the first video signal type;

a second input terminal capable of inputting the first video signal type and the second video signal type;

a first determiner configured to determine whether a video signal is input into each of the first input terminal and the second input terminal and to determine a synchronizing signal type input to each of the first input terminal and the second input terminal;

a frequency measuring unit configured to measure a frequency of a synchronizing signal of the video signal input to the first input terminal and the second input terminal;

a switch configured to connect one of the first input terminal and the second input terminal to the frequency measuring unit;

a second determiner configured to determine a video signal type input into the input terminal which is connected by the switch to the frequency measuring unit on the basis of a determination result of the synchronizing signal type in the first determiner and a measurement result of the frequency in the frequency measuring unit and to determine a video signal type input into the input terminal which is not connected by the switch to the frequency measuring unit on the basis of the determination result of the synchronizing signal type in the first determiner;

an input selector configured to select one of video signal types capable of being input into the first input terminal and the second input terminal; and a switch controller configured to control the switch on the basis of a determination result for the video signal in the first determiner and a video signal type selected by the input selector, wherein the switch controller controls the switch so as to connect the input terminal into which the video signal is input with the frequency measuring unit when the first determiner determines that the video signal is input into only one of the first input terminal and the second input terminal, and to connect the input terminal into which the video signal type selected by the input selector is input with the frequency measuring unit when the first determiner determines that the video signal is input into both of the first input terminal and the second input terminal.

2. The display apparatus according to claim 1, wherein the first video signal type and the second video signal type are respectively an analog RGB signal and a component video signal, and wherein the first determiner determines whether a synchronizing signal type input into the first input terminal and the second input terminal is a sync on green signal.

3. The display apparatus according to claim 1, wherein the second determiner includes a memory in which a frequency of a synchronizing signal corresponding to a format of a component signal is stored, and determines the video signal type input into the input terminal which is connected by the switch to the frequency measuring unit as a component video signal when the determination result of the synchronizing signal type in the first determiner is a sync on green signal and the measurement result of the frequency in the frequency measuring unit corresponds to the frequency stored in the memory, and determines the video signal type input into the input terminal which is not connected by the switch to the frequency measuring unit as the component video signal when the determination result of the synchronizing signal type in the first determiner is the sync on green signal.

4. The display apparatus according to claim 3, wherein the memory stores frequencies of a horizontal synchronizing signal and a vertical synchronizing signal corresponding to the format of the component video signal.

5. The display apparatus according to claim 1, further comprising a display configured to display a video signal type input into the first input terminal and the second input terminal on the basis of the determination result of the second determiner.

6. The display apparatus according to claim 1, wherein the frequency measuring unit measures a frequency of a horizontal synchronizing signal and a vertical synchronizing signal.

* * * * *